United States Patent [19]

Oohasi et al.

[11] 4,348,485

[45] Sep. 7, 1982

[54] SPINEL TYPE FUSED REFRACTORY PRODUCT

[75] Inventors: Kōji Oohasi; Yutaka Hosoda; Toshio Kitamura; Eiichi Kudo, all of Takasago, Japan

[73] Assignee: Asahi Glass Company, Ltd., Tokyo, Japan

[21] Appl. No.: 241,101

[22] Filed: Mar. 6, 1981

[30] Foreign Application Priority Data

Mar. 25, 1980 [JP] Japan ................................. 55/36934

[51] Int. Cl.³ ...................... C04B 35/04; C04B 35/42; C04B 35/44
[52] U.S. Cl. ..................................... 501/115; 501/120
[58] Field of Search ................................. 501/115, 120

[56] References Cited

U.S. PATENT DOCUMENTS 2,599,566  6/1952  Magri ................................. 501/112
3,198,643  8/1966  Alper et al. ........................ 501/115

Primary Examiner—Helen M. McCarthy
Attorney, Agent, or Firm—Oblon, Fisher, Spivak, McClelland & Maier

[57] ABSTRACT

A spinel type dense fused refractory product having excellent corrosion resistance comprises a crystalline structure consisting essentially of more than 50% by weight of composite spinel phase comprising RO component selected from MgO and FeO and R'$_2$O$_3$ component selected from Cr$_2$O$_3$, Al$_2$O$_3$ and Fe$_2$O$_3$ and periclase phase and a small content of glass matrix phase which consists essentially of the following constituents, analytically on a weight basis; a ratio of Cr$_2$O$_3$ to Al$_2$O$_3$ of 3.5 to 5.5; and 20% to 40% of MgO; 1.5% or less of CaO; 15% or less of Fe$_2$O$_3$ (FeO is also calculated for Fe$_2$O$_3$) and 5% or less of SiO$_2$.

5 Claims, No Drawings

SPINEL TYPE FUSED REFRACTORY PRODUCT

BACKGROUND OF THE INVENTION

1. Field of the Invention

The present invention relates to a fused refractory product having excellent corrosion resistance to iron steel slag.

2. Description of the Prior Arts

Fused refractory products having desired shape and size have been prepared by melting a mixture of sources for refractory having a desired composition by an electric furnace etc. and casting the molten composition in a desired mold and annealing the cast composition under a desired controlled condition to recrystallize it. Sometimes, a furnace which contain a molten mixture of the sources for refractory has been cooled without discharging the molten mixture to recrystallize it.

The fused refractory products have been prepared by such process and have been well-known as high grade refractory products which have substantially different structures from the conventional rebonded refractory products obtained by sintering refractory particles.

The well known cast refractory products include $Al_2O_3$-$SiO_2$, $Al_2O_3$, $ZrO_2$-$Al_2O_3$-$SiO_2$, $MgO$-$Al_2O_3$-$Cr_2O_3$ and $Al_2O_3$-$Cr_2O_3$ type refractory products. Among them, the $MgO$-$Al_2O_3$-$Cr_2O_3$ type refractory products have been especially important as a basic refractory product having excellent characteristics superior to the other basic refractory products in the field of industrial production of iron, steel and non-ferrous metals. The refractory products have each stable crystalline structure of periclase and chromespinel phases as main crystals and have excellent corrosion resistance and wearing resistance to various basic slags and have been used for electric furnaces, mixers, vacuum furnace and various smelting furnaces for non-ferrous metals to attain excellent results. A refractory product having superior characteristics has been further required in view of severer conditions in the industrial operation and a development of a superior product has been further required.

SUMMARY OF THE INVENTION

It is an object of the present invention to provide a fused refractory product having superior durability to severe conditions.

The foregoing and other objects of the present invention have been attained by providing a spinel type dense fused refractory product having excellent corrosion resistance which comprises a crystalline structure consisting essentially of more than 50% by weight of composite spinel phase, comprising RO component selected from MgO and FeO and $R'_2O_3$ component selected from $Cr_2O_3$, $Al_2O_3$ and $Fe_2O_3$ and periclase phase and a small content of glass matrix phase which consists essentially of the following constituents, analytically on a weight basis: a ratio of $Cr_2O_3$ to $Al_2O_3$ of 3.5 to 5.5 and 20% to 40% of MgO; 1.5% or less of CaO; 15% or less of $Fe_2O_3$ (FeO is also calculated for $Fe_2O_3$) and 5% or less of $SiO_2$.

DETAILED DESCRIPTION OF THE PREFERRED EMBODIMENTS

The typical conventional cast refractory products in this type which has been commerciallized as MAC-EC (manufactured by Asahi Glass) will be illustrated.

The standard analytical result of MAC-EC is on a weight basis: 15% $Al_2O_3$; 18% $Cr_2O_3$; 8.3% $Fe_2O_3$; 2.6% $SiO_2$ and small amounts of the other components of $TiO_2$ and CaO which is quite different from the compositions and structures of the refractory products of the present invention. For example, the ratio of $Cr_2O_3$ to $Al_2O_3$ is in a range of 3.5 to 5.5 in the present invention wherein it is about 1 to 2 in the conventional refractory product. It is not clear whether this element causes more than 3 times of the corrosion resistance to the iron steel slag of the present invention to the conventional refractory product, however it is true that the element highly affects to the improvement of corrosion resistance.

A basic refractory product having 2 or more of the ratio of $Cr_2O_3$ to $Al_2O_3$ which is higher than the ratio in MAC-EC has been proposed though it has not been practically used. The ratio of $Cr_2O_3$ to $Al_2O_3$ in the product has been about 3 and the structure and composition of the components have been different from those of the refractory products of the present invention.

In accordance with the present invention, it has been succeeded in the production of dense fused refractory products having excellent corrosion resistance by providing the specific structure and composition. Such corrosion resistance has not been attained.

The products of the present invention will be further illustrated.

The fused refractory product of the present invention comprises a major portion of the composite spinel made of RO component and $R'_2O_3$ component (R:Fe or Mg;R':Fe, Al or Cr). The mixture of the chromium source, the alumina source and the magnesia source as the main sources is completely melted in an electric furnace at high temperature such as 2200° C. or higher and the molten composition is fed into a mold having a desired shape and the molten composition is annealed to obtain the products. Most of the sources for refractory are magnesia clinker, chromium iron ore, Bayer alumina and chromium oxide.

The structures of the refractory products of the present invention will be illustrated.

The crystalline structure comprises more than 50% of the composite spinel (MgO, FeO)($Cr_2O_3$, $Al_2O_3$, $Fe_2O_3$) and especially predominant content of $Cr_2O_3$. The refractory product has the physical structure having less pores to be dense and having less apparent porosity of less than 10% especially less than 5%. This is one of the reasons for excellent characteristics. It is considered that the component of $Cr_2O_3$ contributes for reinforcement of the structure as well as to form the spinel structure.

The composite spinel has the structure of whole or partial solid solution of the components of FeO, $Cr_2O_3$, $MgO.Cr_2O_3$, $FeO.Al_2O_3$, $MgO.Al_2O_3$, $MgO.Fe_2O_3$ and $FeO.Fe_2O_3$. Among the components, $Cr_2O_3$ imparts especially important effect. The refractory products usually have the structures of $FeO.Cr_2O_3$ or $MgO.Cr_2O_3$ or solid solution of $Cr_2O_3$ in the whole or part of $Al_2O_3$ or $Fe_2O_3$.

In accordance with the present invention, it is important to have more than 50% of the spinel phase in the wall. If the spinel phase is not satisfactorily formed, it is difficult to obtain a dense fused refractory product having high strength. The corrosion resistance to the iron steel slag of the composite spinel phase having higher content of $Cr_2O_3$ is superior in stable to that of the periclase phase. Thus, the corrosion resistance of the fused refractory product of the present invention is superior for several times to that of the conventional product.

The fused refractory product of the present invention comprises the periclase crystal and small content of the glass matrix comprising silicate as the major component, beside the composite spinel phase. The structure of the product of the present invention consists essentially of more than 50% of the spinel phase and the periclase and a small content of a silicate. The preferable embodiment of the fused refractory product of the present invention consists essentially of 65% to 80% of the spinel phase, 19% to 30% of the periclase phase and 1% to 8% of the glass matrix phase wherein the ratio of $Cr_2O_3$ to $Al_2O_3$ for the components of the spinel is 3.5 or higher and the content of MgO is in a range of 20% to 40%. If the ratio of $Cr_2O_3$ to $Al_2O_3$ is less than 3.5, the reinforced composite spinel is not formed and the product having satisfactory corrosion resistance can not be obtained. When the content of $Cr_2O_3$ is too much, there is possibility to volatilize $Cr_2O_3$ in high temperature zone. Thus, it is necessary to limit the maximum ratio of $Cr_2O_3$ to $Al_2O_3$ to 5.5.

When the content of MgO is less than 20%, the free form of $Cr_2O_3$, $Al_2O_3$ or $Fe_2O_3$ which has not the spinel structure is disadvantageously increased. The product comprising not more than about 60% of MgO can have superior corrosion resistance to slag to the conventional products and the product comprising more than 40% of MgO may have improved characteristics as the cast product in certain fields but have not satisfactory high corrosion resistance to slag as the main object of the present invention as several times such as 3 to 5 times of the corrosion resistance of the conventional products. Thus, it is preferable to limit the content of MgO to not more than 40%, especially not more than 37%. The reason is not clear, however, sometimes, crack is formed in the case of less than 32% of MgO depending upon a size of the cast product. The optimum content of MgO is ranging from 32% to 37%.

The other components for the structure will be illustrated. The fused refractory product having excellent composite spinel structure can be obtained by the structure of on a weight basis:

30% to 60% of $Cr_2O_3$;
5% to 15% of $Al_2O_3$;
0.5% to 5% of $SiO_2$;
0.3% to 1.5% of CaO;
4% to 12% of $Fe_2O_3$ (FeO is also calculated for $Fe_2O_3$).

These components will be illustrated.

When the content of $Cr_2O_3$ is too less, the formation of the spinel having $Cr_2O_3$ is in shortage whereas when it is too much, the vaporization of $Cr_2O_3$ at the high temperature zone is increased.

When the content of $Al_2O_3$ is too small, the cost is increased because of the content the expensive $Cr_2O_3$ is increased, though there is not any serious disadvantage. When the content of $Al_2O_3$ is too much, the content of $Cr_2O_3$ is too less.

When the content of $Fe_2O_3$ is too much, the corrosion resistance to slag is inferior and the melting point is lowered.

The components of $SiO_2$ and CaO are important for forming the glass matrix in the structure together with a part of the component of $Fe_2O_3$. It is difficult to obtain a large cast product without incorporating such components. It is preferable to incorporate not less than 1% especially more than 2% of such components as the glass matrix phase. On the other hand, when the content of such components is too much, the corrosion resistance is inferior and accordingly, it is preferable to be less than 8% especially less than 5% of such components. When the content of $SiO_2$ is not less than 5%, a large content of the glass matrix phase is formed. When the content of CaO is not less than 1.5%, monticellite having lower melting point is disadvantageously formed.

The fused refractory product having such structure of the present invention has only small space of pores to overcome the disadvantage of the pores which is indispensable for cast refractory products. The apparent porosity can be substantially less than 10% and usually in a range of about 3% to 6% especially less than 5%.

As a result, the fused refractory products of the present invention have excellent corrosion resistance of about 3 to 5 times as the corrosion resistance to an electric furnace slag for steel production and more than 3 times of the corrosion resistance to a chimney slag for a borosilicate glass furnace in comparison with the commercially available chromespinel-periclase type refractory product. Thus, the refractory products of the present invention are suitable for the usages for electric furnaces for steel production, mixers, vacuum furnaces, smelting furnaces for non-ferrous metals and chimney of glass furnaces etc. The industrial advantage of the fused refractory product is remarkable.

The fused refractory products of the present invention, have the improved corrosion resistance as the main object and also have satisfactory strength and thermal shock resistance required for the cast refractory products. The fused refractory products can be not only as cast products but also powdery sources for rebonded refractory products obtained by pulverizing the cast products.

The present invention will be further illustrated by certain examples and references which are provided for purposes of illustration only.

EXAMPLES

Magnesia clinker, chromium ore, Bayer alumina and chromium oxide were mixed at specific ratios; to prepare each mixture and 200 kg of each mixture was charged into an arc electric furnace to completely melt at higher than 2200° C. for about 150 minutes. Each molten mixture was fed into a cast mold having a size of 195 mm × 280 mm × 450 mm and the molten mixture in the mold was annealed to the room temperature in a heat insulator to obtain cast refractory products having the compositions and structures shown in Table 1.

TABLE 1

| Sample | 1 | 2 | 3 | 4 | *5 | *6 | *7 |
|---|---|---|---|---|---|---|---|
| Chemical composition (% by weight) | | | | | | | |
| $SiO_2$ | 1.8 | 1.6 | 1.9 | 1.8 | 2.2 | 1.8 | 1.7 |
| $Al_2O_3$ | 9.5 | 10.1 | 11.0 | 10.6 | 14.0 | 16.3 | 10.8 |
| $Fe_2O_3$ | 10.0 | 9.2 | 10.1 | 9.4 | 9.5 | 9.0 | 8.4 |
| $Cr_2O_3$ | 43.0 | 41.9 | 39.9 | 37.7 | 19.5 | 35.9 | 28.8 |
| CaO | 0.5 | 0.5 | 0.6 | 0.6 | 1.0 | 0.6 | 0.6 |
| MgO | 35.0 | 36.7 | 36.5 | 39.9 | 53.0 | 36.4 | 49.7 |
| $Cr_2O_3/Al_2O_3$ | 4.5 | 4.1 | 3.6 | 3.6 | 1.4 | 2.2 | 2.7 |
| Structure (% by weight) | | | | | | | |
| spinel phase | 74.1 | 73.1 | 72.3 | 68.4 | 50.7 | 73.8 | 56.7 |
| periclase phase | 21.5 | 23.0 | 23.1 | 27.2 | 43.9 | 21.8 | 39.1 |
| glass matrix | | | | | | | |

TABLE 1-continued

| Sample | 1 | 2 | 3 | 4 | *5 | *6 | *7 |
|---|---|---|---|---|---|---|---|
| phase | 4.4 | 3.9 | 4.6 | 4.4 | 5.4 | 4.4 | 4.2 |

Note:
Samples 5 to 7 are references.

The physical properties and corrosion resistance of the cast products are shown in Table 2.

TABLE 2

| Sample | 1 | 2 | 3 | 4 | *5 | *6 | *7 |
|---|---|---|---|---|---|---|---|
| Apparent porosity | 3.8 | 4.3 | 4.1 | 2.9 | 6.8 | 3.9 | 6.0 |
| Compressive strength (kg/cm$^2$) | 2230 | 1980 | 1920 | 2480 | 1540 | 1640 | 1450 |
| Corrosion resistance | | | | | | | |
| (A) 1620° C. c/s = 1.6 | 455 | 419 | 389 | 342 | 100 | 299 | 226 |
| (B) 1620° C. c/s = 3.4 | 293 | — | 192 | — | 100 | 205 | 175 |
| (C) 1690° C. c/s = 1.6 | 362 | — | 260 | — | 100 | 199 | 208 |
| (D) 1690° C. c/s = 3.4 | 228 | — | 144 | — | 100 | — | 153 |

Each sample was cut to obtain a dense part inside of 50 mm from the surface (porosity is same) and the following test was carried out by a rotary crucible type corrosion resistance tester. The corrosion resistance was shown as corrosion resistance index based on the Reference sample 5 (typical commercially available sample) by dividing the corroded thickness of Reference sample 5 by the corroded thickness of each sample and multiplying 100.

TEST METHOD

Each crucible was formed by using 35 of trapezoidal samples having a size of 70 mm×50 mm×100 mm and an artificial electric furnace slag for steel production (CaO/SiO$_2$ base degree of 1.6 and 3.4) was charged and the crucible was heated by propane-oxygen burner from the upper part under turning the crucible at 1620° C. for 16 hours or 1690° C. for 5 hours as kinetic test.

In addition to the corrosion resistance test, each corroded surface of each sample was observed by micro-observation after the test. The periclase phases of most of the samples, were changed to be black by absorbing the slag whereas the spinel phases of the products of the invention did not substantially absorb the slag. The spinel phases of the conventional products such as Sample 5, however absorb the slag to change the color.

We claim:

1. A spinel type dense fused refractory product having excellent corrosion resistance which comprises a crystalline structure consisting essentially of (a) 65%–80% by weight of composite spinel phase comprising RO component selected from MgO and FeO and R$_2$O$_3$ component selected from Cr$_2$O$_3$, Al$_2$O$_3$ and Fe$_2$O$_3$: (b) 19% to 30% periclase phase and (c) 1% to 8% of glass matrix phase; which product consists essentially of the following constituents, analytically on a weight basis: 20% to 40% of MgO; 30% to 60% of Cr$_3$O$_3$; 5% to 15% of Al$_2$O$_3$; 0.5% to 5% of SiO$_2$; 0.3% to 1.5% of CaO; and 15% or less of Fe$_2$O$_3$; wherein the ratio of Cr$_2$O$_3$ to Al$_2$O$_3$ is 3.5 to 5.5.

2. The fused refractory product according to claim 1 wherein the ratio of Cr$_2$O$_3$ to Al$_2$O$_3$ is in a range of 4 to 5.

3. The fused refractory product according to claim 1 wherein the Fe$_2$O$_3$ content is from 4% to 12%.

4. The fused refractory product according to claim 1 which comprises 32% to 37% of MgO.

5. The fused refractory product according to claim 1 wherein an apparent porosity is less than 5%.

* * * * *